United States Patent
Oh

[19]

[11] Patent Number: 5,949,485
[45] Date of Patent: Sep. 7, 1999

[54] METHOD OF COMPRESSING A VIDEO SIGNAL BAND TRANSMISSION AND DEVICE THEREFOR

[75] Inventor: Hun Sok Oh, Osan-si, Rep. of Korea

[73] Assignee: Samsung Electronics Co., Ltd., Kyungki-do, Rep. of Korea

[21] Appl. No.: 08/380,315

[22] Filed: Jan. 30, 1995

Related U.S. Application Data

[63] Continuation of application No. 07/822,087, Jan. 17, 1992, abandoned.

[30] Foreign Application Priority Data

Jan. 17, 1991 [KR] Rep. of Korea .......................... 91-747

[51] Int. Cl.$^6$ ..................................................... H04N 7/24
[52] U.S. Cl. .......................... 348/397; 348/424; 348/438
[58] Field of Search ................................ 358/133, 12, 13; 348/397, 388, 390, 438, 439, 424, 425, 384

[56] References Cited

U.S. PATENT DOCUMENTS

| | | | |
|---|---|---|---|
| 2,850,574 | 9/1958 | Kretzmer | 358/133 |
| 3,017,456 | 1/1962 | Schreiber | 358/133 |
| 4,318,126 | 3/1982 | Sassler | 358/141 |
| 4,706,260 | 11/1987 | Fedele | 358/133 |
| 4,829,378 | 5/1989 | LeGall | 358/133 |
| 4,864,396 | 9/1989 | Martens | 358/133 |
| 4,918,524 | 4/1990 | Ansari | 358/133 |
| 4,969,040 | 11/1990 | Gharavi | 348/398 |
| 5,016,100 | 5/1991 | Citta et al. | 348/397 |
| 5,040,062 | 8/1991 | Knauer | 358/133 |
| 5,136,381 | 8/1992 | Citta et al. | 348/437 |
| 5,144,431 | 9/1992 | Citta et al. | 358/141 |
| 5,367,334 | 11/1994 | Nishino et al. | 348/389 |
| 5,469,212 | 11/1995 | Lee | 348/592 |

FOREIGN PATENT DOCUMENTS

| | | | |
|---|---|---|---|
| 2613568 | 10/1988 | France | H04N 5/160 |
| 0127558 | 5/1991 | Japan | H04N 5/140 |

OTHER PUBLICATIONS

Hill, "Hybrid–pulse coding: experimental assessment of system as applied to video signals", Nov. 1969, British Broadcasting Corporation.

Nadas, A.J., "Compression of Video Data Via Three–Dimensional Bandwidth Reduction", IBM Technical Disclosure Bulletin, vol. 19, No. 11, Apr. 1977.

*Primary Examiner*—Bryan Tung
*Attorney, Agent, or Firm*—Sughrue, Mion, Zinn, Macpeak & Seas, PLLC

[57] ABSTRACT

The present invention provides a method of compressing a video signal transmission band and a device therefor which can transmit video without any distortion by selecting only the low frequency components of a video signal with most of the information in a block for digital transmission and extracting DC components from this block thereby performing the compression of the transmission band. The method according to the present invention involves a sub-block determining step for determining a sub-block by separating a low frequency area with respect to horizontal, vertical, and temporal (time) axes, an encoding step for decimating respectively the horizontal and vertical axes to 1/M, generating a band compressing block and finally extracting the DC components, and a decoding step for interpolating the DC components to M times after the encoding step and restoring the block in which the DC components were extracted.

7 Claims, 2 Drawing Sheets

METHOD OF COMPRESSING A VIDEO SIGNAL BAND TRANSMISSION AND DEVICE THEREFOR

This is a continuation of application Ser. No. 07/822,087 filed Jan. 17, 1992, abandoned.

FIELD OF THE INVENTION

The present invention relates to a method of compressing a video signal transmission band for a high picture quality (high-definition) TV system and a device therefor, and more particularly to, a method of compressing a transmission band by extracting a DC component of a low frequency band signal of video signals, and an encoder and decoder for performing such extraction.

BACKGROUND OF THE INVENTION

A television (TV) system requiring high picture quality, such as an ATV, HDTV, and the like provides high picture quality by increasing the number of scanning lines over the conventional 525 lines. Accordingly, there was a problem in performing such high picture quality because a signal distortion of occurred due to the use of analog transmission the video signals.

The distortion of video signals could be eliminated by transmitting the video signals through a digital system. However, there is another problem in that for such a system it becomes much more complicated to transmit the entire band of video signals in digital form because of the large bandwidth of possible video signals.

SUMMARY OF THE INVENTION

The present invention overcomes these problems and provides a method of compressing a video signal transmission band and a device therefor in which it is possible to transmit video signals without distortion by selecting only certain signals having low frequency components with most of the desired information in a block for digital transmitting, extracting DC components from this frequency band, and thereby performing the transmission band compression.

The present invention provides a method of compressing a video signal transmission band comprising a sub-block determining step for determining sub-blocks of a signal by separating a low frequency area with respect to a horizontal, vertical, and temporal (time) axes, an encoding step for decimating or reducing the horizontal and vertical axes to 1/M their natural size, generating band compressing blocks and finally extracting DC components, a decoding step for interpolating the DC components and to M times after the encoding step and restoring the block in which the DC components are extracted.

Also, the present invention provides a device for compressing a video signal transmission band, comprising a horizontal decimation circuit for making the sub-block having predetermined magnitudes of horizontal and vertical spectra and for decimating or reducing a temporal axis of these input video signals to 1/M and compressing the horizontal spectrum to 1/M, a vertical decimation circuit for decimating the vertical axis of the output video signal from this horizontal decimation circuit to 1/M and compressing the vertical spectrum to 1/M and finally extracting an output of DC component, a vertical interpolation circuit for interpolating outputs from the vertical axis of this interpolation circuit to M times, a horizontal interpolation circuit for interpolating outputs from the horizontal axis of an output of this interpolation circuit, and an encoder including an adder for obtaining a difference signal between an input video signal through a delay matching stage and an output signal of the horizontal interpolation circuit.

Further, the present invention provides a device for compressing a video signal transmission band, comprising a vertical interpolation circuit for interpolating a signal of an encoded and transmitted DC component to a vertical axis by M times, a horizontal interpolation circuit for interpolating an output signal from this vertical interpolation circuit to a horizontal axis by M times, and an encoder including an adder for receiving an analog input signal component excluding an encoded and transmitted DC component through a delay matching stage and adding a finally interpolated output signal from said horizontal interpolation circuit and restoring an original signal.

DETAILED DESCRIPTION OF THE PREFERRED EMBODIMENT

A preferred embodiment of a device for compressing a video signal transmission band according to the present invention is described in detail with reference to the accompanying drawings.

Figure 1:
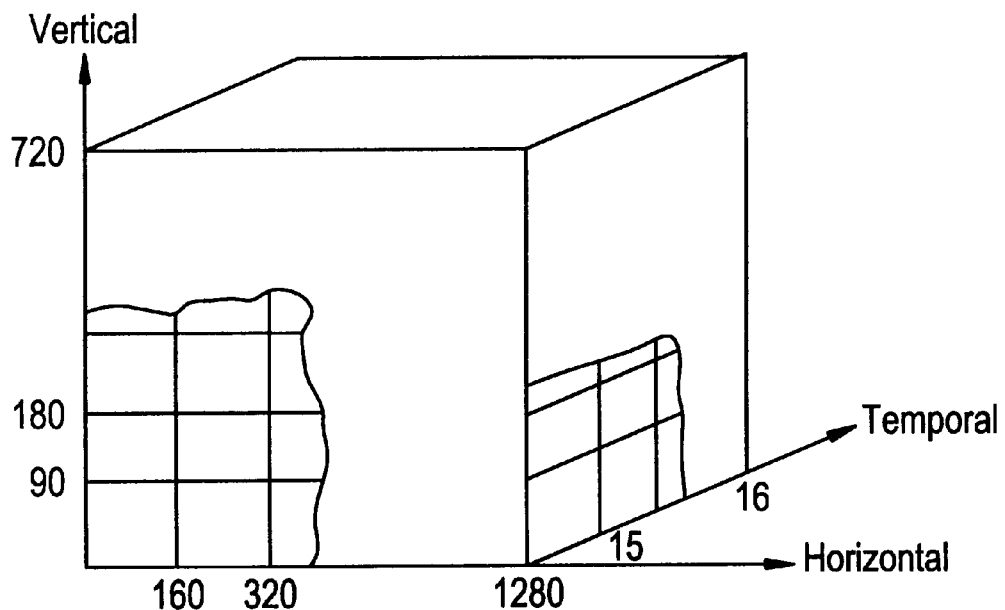
FIG. 1 is a characteristic diagram showing a three-dimensional spectrum with horizontal, vertical, and temporal axes of video signals.

FIG. 1 shows a three dimensional TV picture using horizontal, vertical and temporal (time) axes. It consists of 720 LPH (Lines/Picture Height) in a horizontal axis, 1280 SPW (Samples/Picture width) in a vertical axis, and 60 FPS (Frame/sec) in a temporal axis. A low frequency component with a lower value in horizontal and vertical axes includes most of the picture information of the video signals.

Figure 2:
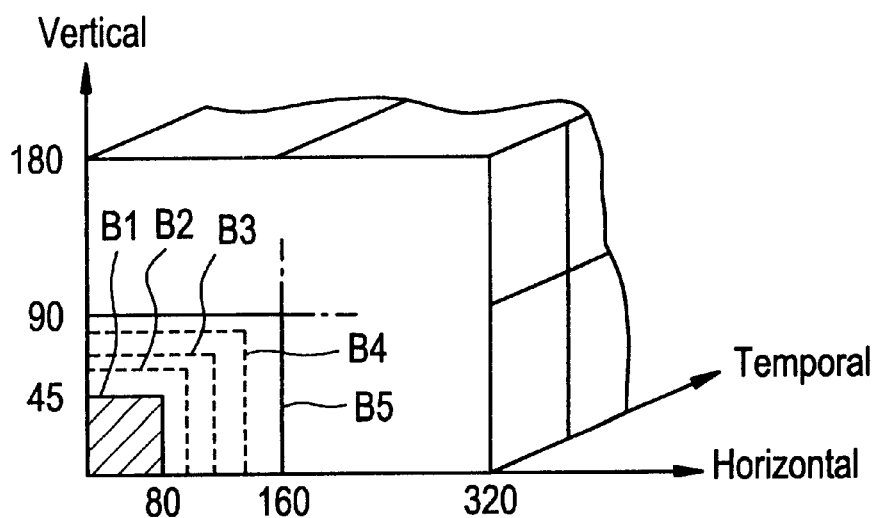
FIG. 2 is a characteristic diagram of a three dimensional extracted DC component used for compressing a video signal transmission band according to the present invention.

The low frequency component corresponding to 90 LPH in a vertical axis, 160 SPW in a horizontal axis, and 15 FPS in a temporal axis, is shown magnified in FIG. 2.

Since most information of the video signals are present in the signal band B5 shown in FIG. 2, DC components of this spectrum are preferable for performing the present invention. But since this signal band becomes too large in bandwidth, it is divided into ½ the spectrum, and by considering a redundancy of the bandwidth of a channel it becomes a block B1 made of 45 LPH in a vertical axis and 80 SPW in a horizontal axis.

Of course, such division of a block is performed with considering a band of a particular, it can be divided to a block B2, B3, B4 or B5 and so on according to the redundancy of the bandwidth of the desired channel.

A preferred embodiment, however, of the present invention will be explained referring to block B1.

As shown in FIG. 1 and FIG. 2, it is assumed that the DC component is present in a block B5, the 90×160 block of low band in horizontal and vertical axis, and when the DC component is taken to be a magnitude of the block B1, the block B5 is decimated or reduced by 2:1 for the horizontal and vertical axes. When video signals of 720×1280 are divided into sub-blocks of 4×4 in vertical and horizontal axes, and a magnitude of the DC component is regarded as that of the block B2, a decimation of 4:1 in the horizontal and vertical axes is required.

This, a magnitude of DC components is determined by considering a band of a channel use din the transmission system and so on.

Figure 3:
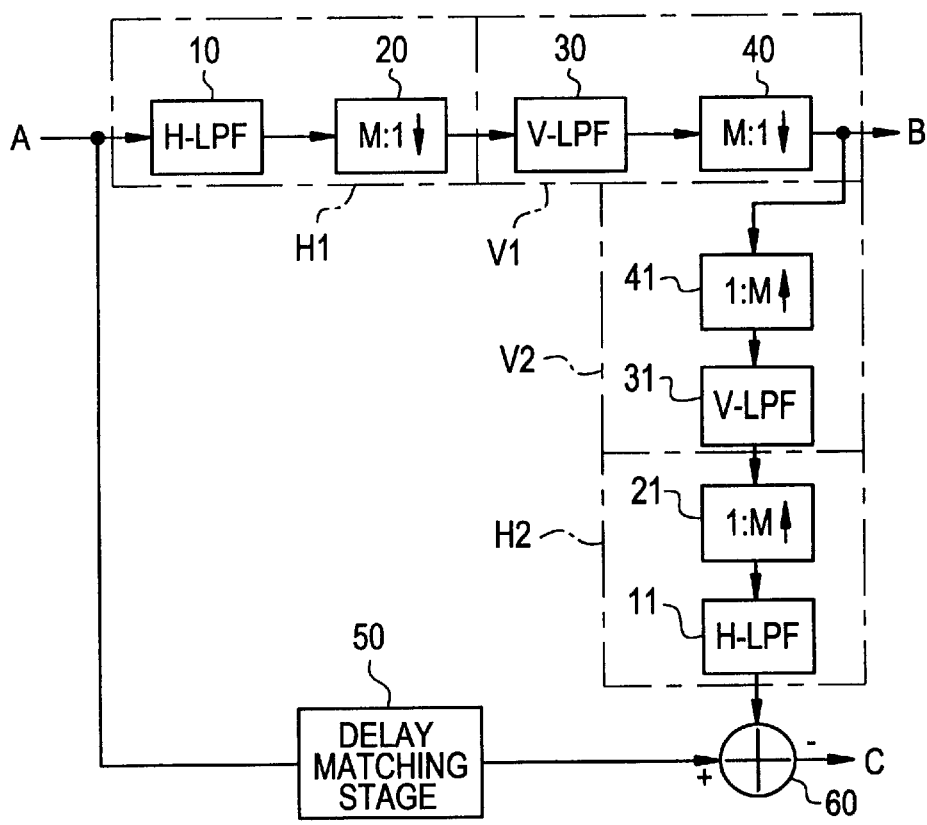
FIG. 3 is a block diagram of an encoder of a device for compressing a video signal transmissions band according to the present invention.

A configuration for extracting the DC components of the block B1 (shown in FIG. 2) is shown in FIG. 3. FIG. 3 shows a configuration of an encoder for transmitting a video signal by extracting DC components, where an input video signal a is a video signal of the sub-block B5 with dimensions of 90×160 according to the present invention.

The encoder of the present invention is constructed such that: a decimation circuit H1 for a horizontal axis includes a horizontal low pass filter H-LPF 10 and a decimeter 20 connected thereto is used for filtering and decimating the horizontal low band of this video signal produced by filter H-LPF. A vertical decimation circuit V1 includes a vertical low pass filter V-LPF 30 and a decimeter 40 connected thereto for filtering and decimating the vertical low band from a signal passed through the horizontal decimation circuit H1. The DC component extraction is executed so that a digital output signal B that is a DC component having a dimension of, 45×80 such as the block B1, is generated. A vertical interpolation circuit V2 includes an interpolator 41 for interpolating the DC component signal extracted from the video signal A and a vertical low band pass filter V-LPF 31 connected thereto. A horizontal interpolation circuit H2 includes an interpolator 21 made of a post stage of the vertical interpolation circuit V2, for executing a horizontal interpolation, and a horizontal low band pass filter H-LPF 11 connected thereto such that the 45×80 signal is interpolated. The output of a delay matching stage 50 is summed with a signal generated through each interpolating circuit V2, H2 so as to output the remaining video signal spectrum; that is, the video signal A without the extracted DC component included.

Thus a signal C of the adder 60 is outputted from the signals of a remaining analog component of which the DC component is deducted from a spectrum (90×160) of the video signal.

Figure 4:
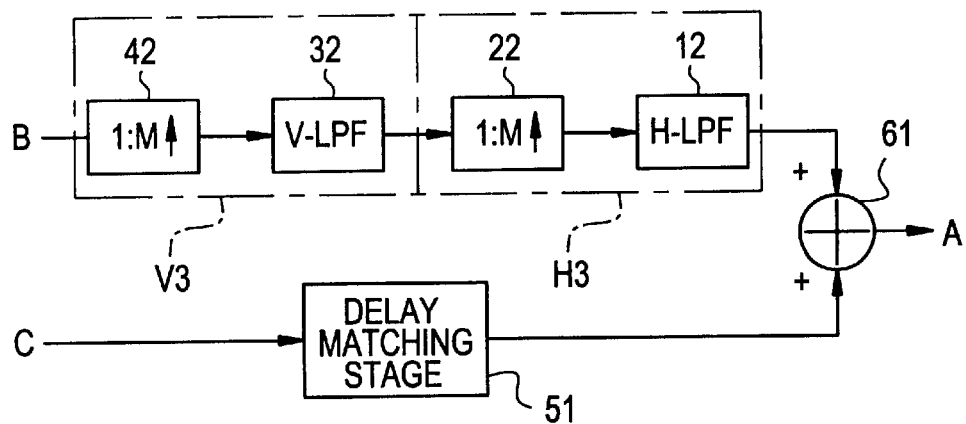
FIG. 4 is a block diagram of a decoder of a device for compressing a video signal transmission band compressing according to the present invention.

On the receiving end, a configuration of the decoder circuit which receives a transmission of a digital output signal B produced by extraction of the DC component, and a remaining output signal C of an adder 60 to reproduce the original signal A is shown in FIG. 4. The decoder comprises a vertical interpolation circuit V3 including an interpolator 42, for interpolating a vertical signal from the signal B transmitted in digital form, and a vertical low band pass filter 32 for filtering a low band signal from the output of the interpolator 42. A horizontal interpolation circuit H3 including an interpolator 22 for interpolating a horizontal signal from the signal B, a horizontal low band pass filter 12 for filtering a low band from the output of this interpolator 22, an adder 61 for receiving an input of the signal C of a remaining spectrum without the DC component through a delay matching stage 51 and for summing with the interpolated signal of the vertical and horizontal axes and providing an original video signal A.

An operation of a method of compressing a video signal transmission ban according to the present invention is described below. An input video signal A with a spectrum (90×160) of the block B5 becomes a 90×80 spectrum through operation of the horizontal decimation circuit H1 and is further decimated to 45×80 spectrum is extracted and transmitted in digital form.

Here, the low band pass filter 10 passes a horizontal low band and the low band signal is decimated to M:1 at the decimeter 20, and M becomes 2 in this preferred embodiment.

Accordingly, the output of the decimeter 20 is decimated to ½ only in the horizontal axis and becomes a 90×80 spectrum. This signal passes only the low band through the vertical low band pass filter 30 and the vertical axis is decimated to M:1, i.e., 2:1 through the decimeter 40 and a DC signal component of 45×80 is outputted. This output signal B is transmitted in digital form to the receiving side without a distortion.

A vertical interpolation circuit V2 and the horizontal interpolation circuit H2, inversely combined relative to the combinations of the horizontal decimation circuit H1 with the vertical decimation circuit V1 (described above), are provided for eventually transmitting a remaining analog signal A without the 45×80 spectrum. Thus, the interpolator 41 of the vertical interpolation circuit V2 interpolates the 45×80 spectrum to 1:M and outputs a signal interpolated with the vertical axis, i.e., a signal of 90×80 through the low band pass filter 31. This signal is interpolated to 1:M by the horizontal interpolator 21 and interpolated to a signal of 90×160 thus, the signal is interpolated with the horizontal axis through the low band pass filter 11 and interpolated to the same spectrum as the original input video signal A of the horizontal decimation circuit H1.

Since the input video signal A is also provided to the adder 60 through the delay matching stage 50, the interpolated signal and the original signal are summed at the adder 60 and their difference signal is outputted.

That is, the output signal C is the signal without the DC which was extracted from the video signal A of the original signal. This signal C is treated by an analog transmission circuit of a normal method for transmissions to a receiver.

Thus, the low band signal, the DC component of the block B1 of FIG. 2, which is the signal of low band, is transmitted in digital form, while the remaining video signal of the sub-block B5 is transmitted in analog form.

A circuit for restoring the transmitted signal to the original signal at the receiving side is the decoder of FIG. 4. The decoder receives both the signal B transmitted in digital form and the signal C transmitted in analog form. The decoder also performs the interpolation by 90×160 through the vertical interpolation circuit V3 and the horizontal interpolation circuit H3, which are the same configuration as the vertical and horizontal interpolation circuits V2, H2 of the encoder (described above).

That is, the signal B of 45×80 is interpolated two-folds first through the interpolator 42 interpolating the input signal to 1:M and the vertical low band pass filter 32 so that the signal B becomes a signal of 90×80 with respect to the vertical axis. This signal B is interpolated a second time through the interpolator 22 interpolating also to 1:M and the horizontal low band pass filter 12 with respect to the horizontal axis so as to be a signal spectrum of 90×160; thus having the same magnitude as the original signal A appearing at the encoder side.

This signal B is provided into an adder 61 to be combined together with the signal C provided from the delay matching stage and transmitted through the encoder in analog form.

Accordingly, since a signal of an extracted DC component is interpolated and added to an analog signal, the output of the adder 61 becomes the same signal as the original signal A.

Consequently, since the receiving side receives the signal transmitted from the transmitting side almost completely without distortion, the picture quality is greatly improved when displayed.

In the alternative, the characteristics of the vertical low band pass filters 30, 31, 32 used at the encoder and decoder could be determined in accordance with their transmitting form, and if the characteristic of the filters are good, all the components of 45×80 are extracted, otherwise, a quantity of the analog transmitting data is increased.

However, with the present invention, since the original signal A and the output signal from the decoder becomes equal regardless of the characteristic of the filters, the characteristic of the filters is not so important.

As described above, a method of compressing a video signal transmission band and device therefor according to the present invention comprises a sub-block determining step for determining the sub-block by separating a low frequency area with respect to horizontal, vertical and temporal axes, an encoding step for decimating the horizontal and vertical axes respectively to 1/M with respect to a sub-block and finally extracting a DC component after the sub-block determining step, and a decoding step for interpolating the DC component respectively to M times in the horizontal and vertical axes after the encoding step. Because only a video signal of low frequency band with most of the information in video signals with a predetermined spectrum is transmitted in digital form the distortion of the signal does not occur.

Accordingly, a degradation of the picture quality due to the continuous transmission of video signals can be prevented in display devices such as a TV requiring a high picture quality, and therefore the visibility can be greatly improved.

What is claimed is:

1. A method of compressing an input video signal for transmission, the method comprising the steps of:

(a) separating the input video signal into frequency components representing horizontal and vertical components of the input video signal using first and second filters, respectively, wherein said first filter is a lowpass filter for passing low band frequencies of said horizontal component, and said second filter is a lowpass filter for passing low band frequencies of said vertical component;

(b) decimating only the low band frequencies respectively output by said first and second filters using first and second decimators, respectively, wherein said first and second decimators decimate the low band frequencies by M:1 to produce a digital output signal representing horizontal and vertical low band frequency components of the input video signal, wherein M is a real number;

(c) interpolating only the digital output signal, prior to transmission thereof, using first and second interpolators for respectively interpolating low band frequencies making up the digital output signal corresponding to said horizontal and vertical components to produce an analog output signal representing horizontal and vertical low band frequency components of the input video signal;

(d) delaying the input video signal for a time period corresponding to a time period required to execute steps (a) through (c), and passing the delayed input video signal simultaneously with the output of the analog output signal produced in step (c);

(e) producing an analog difference signal representing a difference between the delayed input video signal and the analog output signal; and (f) transmitting both the digital output signal and the analog difference signal as a representation of the input video signal.

2. A method of reproducing an input video signal represented by a digital output signal and an analog difference signal, wherein the digital output signal includes low band frequency components representing horizontal and vertical components of the input video signal, and the difference signal represents a difference between the input video signal and the horizontal and vertical low band frequency components represented by the digital output signal, the method comprising the steps of:

(a) interpolating only the digital output signal using first and second interpolators for respectively interpolating the horizontal and vertical low band frequency components making up the digital output signal, and passing interpolated horizontal and vertical frequency components using first and second filters, respectively, wherein said first and second filters are low pass filters;

(b) delaying the difference signal for a period of time corresponding to a period of time required to execute step (a), and passing the delayed difference signal simultaneously with the output of said first and second filters; and (c) adding the delayed difference signal together with the outputs of said first and second filters to produce an output video signal substantially identical to the input video signal.

3. A method of compressing an input video signal for transmission over a transmission channel from a transmitting unit to a receiving unit, the method comprising the transmitting steps of:

(a) separating the input video signal into frequency components representing horizontal and vertical components of the input video signal using first and second filters, respectively, wherein said first filter is a lowpass filter for passing low band frequencies of said horizontal component, and said second filter is a lowpass filter for passing low band frequencies of said vertical component;

(b) decimating only the low band frequencies respectively output by said first and second filters using first and second decimators, respectively, wherein said first and second decimators decimate the low band frequencies by M:1 to produce a digital output signal representing horizontal and vertical low band frequency components of the input video signal, wherein M is a real number;

(c) interpolating only the digital output signal, prior to the transmission thereof, using first and second interpolators for respectively interpolating low band frequencies making up the digital output signal corresponding to said horizontal and vertical components, respectively, to produce an analog output signal representing horizontal and vertical low band frequency components of the input video signal;

(d) delaying the input video signal for a time period corresponding to a time period required to execute steps (a) through (c), and passing the delayed input video signal simultaneously with the output of the analog output signal produced in step (c);

(e) producing an analog difference signal representing the difference between the delayed input video signal and the analog output signal; and (f) transmitting, from the transmitting unit, both the digital output signal and the analog difference signal as a representation of the input video signal;

the method further comprising the receiving steps of:

(g) interpolating, at the receiving unit, the digital output signal using first and second interpolators for respectively interpolating the horizontal and vertical low band frequency components making up the digital output signal, and passing interpolated horizontal and vertical frequency components using first and second filters, respectively, wherein said first and second filters are low pass filters;

(h) delaying the difference signal for a period of time corresponding to a period of time required to execute step (g), and passing the delayed difference signal simultaneously with the output of said first and second filters; and (i) adding the delayed difference signal together with the outputs of said first and second filters to produce an output video signal substantially identical to the input video signal which was input to the transmitting unit.

4. A apparatus for compressing an input video signal for transmission, the apparatus comprising:

first and second filters for separating the input video signal into frequency components representing a horizontal and vertical components of the input video signal, respectively, wherein said first filter is a lowpass filter for passing low band frequencies of said horizontal component, and said second filter is a lowpass filter for passing low band frequencies of said vertical component;

first and second decimators for decimating only the low band frequencies respectively output by said first and second filters, respectively, wherein said first and second decimators decimate the low band frequencies by M:1 to produce a digital output signal representing horizontal and vertical low band frequency components of the input video signal, wherein M is a real number;

first and second interpolators for interpolating only the digital output signal, prior to transmission thereof, by respectively interpolating low band frequencies making up the digital output signal corresponding to said horizontal and vertical components to produce an analog output signal representing horizontal and vertical low band frequency components of the input video signal;

a matching delay circuit for delaying the input video signal for a time period corresponding to a time period required to produce the analog output signal in response to the input video signal, and for passing the delayed input video signal simultaneously with the output of the analog output signal;

a analog difference circuit for producing an difference signal representing the analog difference between the delayed input video signal and the analog output signal; and a transmitter circuit for transmitting both the digital output signal and the difference signal as a representation of the input video signal.

5. An apparatus for producing an output video signal from an input video signal represented by a digital output signal and an analog difference signal, wherein the digital output signal includes low band frequency components representing horizontal and vertical components of the input video signal, and the difference signal represents a difference between the input video signal and the horizontal and vertical low band frequency components of the input video signal, the apparatus comprising:

first and second interpolators for respectively interpolating only the horizontal and vertical low band frequency components making up the digital output signal;

first and second filters for passing interpolated horizontal and vertical frequency components using first and second filters, respectively, wherein said first and second filters are low pass filters;

a matching delay circuit for delaying the difference signal for a period of time corresponding to a period of time required for the interpolated horizontal and vertical frequency components to be passed by said first and second filters in response to receipt of the digital output signal, and for passing the delayed difference signal simultaneously with the output of said first and second filters; and an adding circuit for adding the delayed difference signal together with the outputs of said first and second filters to produce an output video signal substantially identical to the input video signal.

6. A system for compressing an input video signal for transmission over a transmission channel, the system comprising:

a transmitting unit and a receiving unit;

said transmitting unit comprising:

first and second filters for separating the input video signal into frequency components representing horizontal and vertical components of the input video signal, respectively, wherein said first filter is a lowpass filter for passing low band frequencies of said horizontal component, and said second filter is a lowpass filter for passing low band frequencies of said vertical component;

first and second decimators for decimating only the low band frequencies respectively output by said first and second filters, respectively, wherein said first and second decimators decimate the low band frequencies to produce a digital output signal representing horizontal and vertical low band frequency components of the input video signal; first and second interpolators for interpolating only the digital output signal, prior to the transmission thereof, by respectively interpolating low band frequencies making up the digital output signal corresponding to said horizontal and vertical components to produce an analog output signal representing horizontal and vertical low band frequency components of the input video signal;

a matching delay circuit for delaying the input video signal for a time period corresponding to a time period required to produce the analog output signal in response to the input video signal, and for passing the delayed input video signal simultaneously with the output of the analog output signal;

an analog difference circuit for producing a difference signal representing a difference between the delayed input video signal and the analog output signal; and a transmitter circuit for transmitting both the digital output signal and the analog difference signal as a representation of the input video signal;

said receiving unit comprising:

first and second interpolators for interpolating the digital output signal by respectively interpolating the horizontal and vertical low band frequency components making up the digital output signal;

first and second filters for respectively passing interpolated horizontal and vertical frequency components, wherein said first and second filters are low pass filters;

a matching delay circuit for delaying the difference signal for a period of time corresponding to a period of time required for the interpolated horizontal and vertical frequency components to be passed by said first and second filters in response to receipt of the digital output signal, and for passing the delayed difference signal simultaneously with the output of said first and second filters; and an adding circuit for adding the delayed difference signal together with the outputs of said first and second filters to produce an output video signal substantially identical to the input video signal.

7. The system of claim 6, wherein said input video signal is a high-definition television (HDTV) signal consisting of 720 lines per picture height in its horizontal component and 1280 samples per picture width in its vertical component, and wherein said first and second decimators respectively decimate the low band frequencies of the horizontal and vertical components by M:1, and said first and second interpolators respective interpolate the horizontal and vertical frequency components by 1:M, wherein M is a real number greater than 1.

* * * * *